United States Patent Office 2,819,193
Patented Jan. 7, 1958

2,819,193
SOLUTION AND PROCESS FOR TREATING METAL SURFACES

Werner Rausch, Frankfurt, Germany, assignor to Parker Rust Proof Company, Detroit, Mich., a corporation of Michigan No Drawing. Application June 23, 1953
Serial No. 363,660

Claims priority, application Germany June 24, 1952

10 Claims. (Cl. 148—6.16)

This invention relates to a solution and process for forming chemical coatings on metallic surfaces.

In the art of forming chemical coatings on the surfaces of metals which in the bare condition are subject to corrosion, unsuitable as a base for paints or incapable of being deformed without destroying the original surface finish, the use of phosphate coatings is now well known. It is also known that oxalic acid and ferric oxalate solutions are superior to phosphoric acid solutions for forming protective chemical coatings on stainless steel surfaces. The fields of applicability of phosphoric acid solutions and oxalic acid solutions have been long considered by those skilled in the art to be separate and distinct. Moreover the art has considered oxalic acid and phosphoric acid to be mutually poisonous relative to the formation of protective chemical coatings on metallic surfaces.

In accordance with the present invention it has now been found that phosphoric acid and oxalic acid may be advantageously employed in the same solution to successfully provide coatings on a wide variety of substrate metals.

The principal object of this invention is to provide a composition and process for providing on the surfaces of iron, steel, stainless steel and other alloys containing relatively high percentages of nickel and/or chromium, a chemical coating which is useful in increasing resistance to corrosion, is suitable as a base for paint and facilitates metal deformation operations.

It has been found in accordance with this invention that oxalic acid becomes compatible with and extends the field of usefulness of phosphoric acid if the phosphoric acid is in the form of an alkali metal phosphate and there is present in the composition an alkali metal chromate or dichromate. As used in this specification and in the appended claims, the term "alkali metal" is intended in its broad sense to include ammonium. The chromates or dichromates apparently act as accelerators for the phosphate and oxalic acid combination. It is thought that the alkali metal chromate or dichromate releases chromic acid, in solution, which reacts with the oxalate or oxalic acid to form a chromium oxalate salt, and in this form the oxalate complements the phosphoric acid and increases the field of its applicability. If desired, the compositions of this invention may also contain additions of ferric oxalate or chromium oxalate salt.

The solutions are preferably maintained in a pH range of 1.0 to 3.0.

The aqueous compositions of this invention may have the range of proportion of ingredients as set forth below.

FORMULA I

| | Grams/liter |
|---|---|
| Sodium dichromate·$2H_2O$ | 0.1–3.0 |
| Sodium dihydrogen phosphate·$2H_2O$ | 10–100 |
| Oxalic acid·$2H_2O$ | 3–30 |

FORMULA II

| | Grams/liter |
|---|---|
| Sodium dihydrogen phosphate·$2H_2O$ | 10–100 |
| Ferrous oxalate·$2H_2O$ | 1–17 |
| Sodium dichromate·$2H_2O$ | 1–17 |
| Sodium chloride | 0.1–20 |
| Oxalic acid dihydrate—sufficient to provide a pH in the range of | 1–3 |

The compositions of this invention may be prepared by merely admixing the required components, and it will be understood that other alkali metals may be substituted for sodium. The chloride provided by the sodium chloride in Formula II acts as an activator which increases the reactivity of the aqueous solutions with the more resistant metals such as stainless steel and alloys high in nickel and/or chromium content. Other halides such as fluorides, bromides and iodides may be used instead of chloride, but chloride is preferred. Thiocyanate may also be employed satisfactorily. The proportion of halide which is necessary for any particular application to provide the required degree of activation will of course vary with the substrate metal being coated, but may be readily determined by a few simple tests under operating conditions. For the more difficultly coated stainless steels or other alloys, it may be necessary to increase the chloride ion content to as high as 150 grams per liter. Thiocyanate may be used in proportions of about 1½% to about 40%. The other halides are useful in quantities equivalent to that given for chloride.

The compositions of this invention may be satisfactorily operated at temperatures between about 70° F. and 140° F. While the use of the higher temperatures assists in increasing the rate of the formation of the coating, it is inadvisable to exceed about 140° F. since the oxalate or oxalic acid portion of the composition begins to decompose and to reduce the efficiency of the coating formation.

The immersion of metallic articles of iron, steel, stainless steel or other alloys high in chromium and/or nickel content in the compositions of this invention produces on the surface of the metal a finely crystalline coating which is adherent, highly resistant to removal by abrasion and additionally suitable as a base for paint, lacquer, enamel, varnish or the like. For the highest degree of protection against corrosion, it is desirable to treat the coating with an oil in a manner which is now conventional in the art. Moreover, where the coating is intended to function primarily to increase the resistance of the metal to corrosion, it is preferred to employ a composition which does not contain a halide. Where corrosion protection is desired, the substrate is normally iron or steel and good coatings are readily obtained on such metals in the absence of an activator. The use of halides and thiocyanate is especially beneficial in reducing the time required to form a coating with stainless steels or other normally corrosion-resistant alloys, and in this case the presence of the halide has no harmful effect.

The examples given below illustrate the invention in greater detail.

*Example 1*

An operating solution was prepared containing:

| | Grams/liter |
|---|---|
| Sodium dihydrogen phosphate·$2H_2O$ | 88 |
| Oxalic acid·$2H_2O$ | 25 |
| Sodium dichromate·$2H_2O$ | 2 |

The solution was found to have a pH of 2.0. Steel panels immersed in the solution at 120° F. were coated with a greenish adherent coating which was finely crystalline. The coating was found to resist abrasion, and when treated with conventional lubricants to facilitate metal drawing operations. After oiling, the coating was found to greatly increase the resistance of the metal to corrosion. A number of panels were lacquered, and the coating was found to be excellent as a base for the lacquer.

*Example II*

| | Grams/liter |
|---|---|
| Sodium dihydrogen phosphate·2H₂O | 88 |
| Oxalic acid·2H₂O | 39.7 |

The phosphate and oxalic acid were dissolved in water and 17.9 grams per liter of ferrous oxalate dihydrate was added thereto. To this mixture 10.5 grams per liter of sodium dichromate dihydrate was added and stirred in. The solution after stirring, assumed a dark brown-green color and was found to have a pH of 2.0.

*Example III*

| | Grams/liter |
|---|---|
| Sodium dihydrogen phosphate·2H₂O | 88 |
| Oxalic acid·2H₂O | 39.7 |
| Ferrous oxalate·2H₂O | 17.9 |
| Sodium dichromate·2H₂O | 10.5 |
| Sodium chloride | 5 |

Stainless steel panels (18-8) were immersed in the solution at 125° F. A coating similar to that obtained on steel in Example I was obtained.

What is claimed is:

1. A composition of matter which consists essentially of 10-100 grams/liter of an alkali metal phosphate, 0.1-3.0 grams/liter of an alkali metal chromate and 3-30 grams/liter of oxalic acid dihydrate in aqueous solution, said composition having a pH in the range of 1-3.

2. A composition of matter which consists essentially of an aqueous solution of 10-100 grams/liter of an alkali metal phosphate, 0.1-3.0 grams/liter of an alkali metal chromate, 3-30 grams/liter of oxalic acid and a 0.1-150 grams/liter of halide, said composition having a pH in the range of 1-3.

3. A composition of matter which consists essentially of an aqueous solution of 0.1-3.0 grams/liter of sodium dichromate dihydrate, 10-100 grams/liter sodium dihydrogen phosphate dihydrate, 3-30 grams/liter of oxalic acid dihydrate, said composition having a pH in the range of 1-3.

4. A composition of matter which consists essentially of an aqueous solution of 10-100 grams/liter of sodium dihydrogen phosphate dihydrate, 1-30 grams/liter ferrous oxalate dihydrate, 1-17 grams/liter sodium dichromate dihydrate, 0.1-150 grams/liter chloride ion and sufficient oxalic acid to provide a pH in the range of 1-3.

5. A composition of matter which consists of an aqueous solution of sodium dihydrogen phosphate dihydrate—10-100 grams/liter; ferrous oxalate dihydrate—1-30 grams/liter; sodium dichromate dihydrate—1-17 grams/liter; sodium chloride—0.1-20 grams/liter and sufficient oxalic acid dihydrate to provide a pH in the range of 1-3.

6. A method for forming a protective coating on a metal of the class consisting of iron, steel, stainless steel and alloys of iron containing at least one of nickel and chromium which comprises the step of contacting the metal surface with a composition consisting essentially of 10-100 grams/liter of an alkali metal phosphate, 0.1-3.0 grams/liter of an alkali metal chromate and 3-30 grams/liter of oxalic acid in an aqueous solution having a pH in the range of 1-3, said composition having a temperature in the range of about 70° F. to 140° F. and maintaining the metal surface in contact with said composition until a protective coating is formed.

7. A method for forming a protective coating on a metal of the class consisting of iron, steel, stainless steel and alloys of iron containing at least one of nickel and chromium which comprises the step of contacting the metal surface with a composition consisting essentially of 10-100 grams/liter of an aqueous solution of alkali metal phosphate, 0.1-3.0 grams/liter of an alkali metal chromate, 3-30 grams/liter of oxalic acid and 0.1-150 grams/liter of a halide, said composition having a pH in the range of 1-3, said composition having a temperature in the range of about 70° F. to 140° F. and maintaining the metal surface in contact with said composition until a protective coating is formed.

8. A method for forming a protective coating on a metal of the class consisting of iron, steel, stainless steel and alloys of iron containing at least one of nickel and chromium which comprises the step of contacting the metal surface with a composition which consists essentially of an aqueous solution of 0.1-3.0 grams/liter of sodium dichromate dihydrate, 10-100 grams/liter sodium dihydrogen phosphate dihydrate, 3-30 grams/liter of oxalic acid dihydrate, said composition having a pH in the range of 1-3, said composition having a temperature in the range of about 70° F. to 140° F. and maintaining the metal surface in contact with said composition until a protective coating is formed.

9. A method for forming a protective coating on a metal of the class consisting of iron, steel, stainless steel and alloys of iron containing at least one of nickel and chromium which comprises the step of contacting the metal surface with a composition which consists essentially of an aqueous solution of 10-100 grams/liter of sodium dihydrogen phosphate dihydrate, 1-30 grams/liter ferrous oxalate dihydrate, 1-17 grams/liter sodium dichromate dihydrate, 0.1-150 grams/liter chloride ion and sufficient oxalic acid to provide a pH in the range of 1-3 said composition having a temperature in the range of about 70° F. to 140° F. and maintaining the metal surface in contact with said composition until a protective coating is formed.

10. A method for forming a protective coating on a metal of the class consisting of iron, steel, stainless steel and alloys of iron containing at least one of nickel and chromium which comprises the step of contacting the metal surface with a composition which consists essentially of an aqueous solution of sodium dihydrogen phosphate dihydrate—10-100 grams/liter; ferrous oxalate dihydrate—1-30 grams/liter; sodium dichromate dihydrate—1-17 grams/liter; sodium chloride—0.1-20 grams/liter and sufficient oxalic acid dihydrate to provide a pH in the range of 1-3, said composition having a temperature in the range of about 70° F. to 140° F. and maintaining the metal surface in contact with said composition until a protective coating is formed.

References Cited in the file of this patent

UNITED STATES PATENTS

| 1,315,017 | Gravell | Sept. 2, 1919 |
| 1,911,537 | Tanner | May 30, 1933 |
| 2,077,450 | Weisberg et al. | Apr. 20, 1937 |
| 2,527,828 | Kruszynski et al. | Oct. 31, 1950 |
| 2,577,887 | Gibson | Dec. 11, 1951 |
| 2,712,511 | Orozco | July 5, 1955 |

FOREIGN PATENTS

| 811,648 | Germany | Aug. 23, 1951 |

U. S. DEPARTMENT OF COMMERCE
PATENT OFFICE
CERTIFICATE OF CORRECTION

Patent No. 2,819,193 January 7, 1958

Werner Rausch

It is hereby certified that error appears in the printed specification of the above numbered patent requiring correction and that the said Letters Patent should read as corrected below.

Column 2, line 4, for "Ferrous oxalate·$2H_2O$ – – – – – – 1-17" read -- Ferrous oxalate·$2H_2O$ – – – – – – 1-30 --.

Signed and sealed this 1st day of April 1958.

(SEAL)
Attest:
KARL H. AXLINE
Attesting Officer

ROBERT C. WATSON
Commissioner of Patents